United States Patent [19]

Siegel

[11] 4,041,705
[45] Aug. 16, 1977

[54] LOW TEMPERATURE ENGINE

[76] Inventor: Israel Siegel, 351 W. 71 St., New York, N.Y. 10023

[21] Appl. No.: 674,552

[22] Filed: Apr. 7, 1976

[51] Int. Cl.² ............................................... F03G 7/04
[52] U.S. Cl. ........................................ 60/497; 60/641
[58] Field of Search ................. 60/495, 497, 530, 531, 60/641

[56] References Cited

U.S. PATENT DOCUMENTS 3,846,984  11/1974  Siegel .................................. 60/531 X Primary Examiner—Allen M. Ostrager

[57] ABSTRACT

The invention describes a new type of engine particularly adapted for the conversion of solar thermal energy at low temperature to mechanical and electrical energy. A relatively cold and a relatively warm chambers are sealed from the outside environment and contain a low boiling point evaporating fluid. A tube dips at its lower open end in the fluid phase of the warm chamber. The upper open end of the tube is branched and opens into the vapor phases of the cold and warm chambers. The level of the fluid in the lower end of the tube rises and falls in response to alternate opening and closing of the communications of the tube with the vapor phases of the warm and cold chambers. The movement of fluid is translated to useful work through a float responding to the fluid levels. A high density fluid may be used in the warm chamber to increase the buoyant force acting upon the float. One modification of the engine functions as a highly efficient fuel-operated steam engine.

11 Claims, 4 Drawing Figures

LOW TEMPERATURE ENGINE

BACKGROUND OF THE INVENTION

The invention relates to engines adapted to operate at low temperature and in particular to improvements in temperature differential fluid motors previously described by the author in U.S. Pat. No. 3,846,984 (application No. 464,823 filed Apr. 29, 1974).

Solar energy is available in practically unlimited quantities, is renewable, and pollution free. It, however, reaches the earth in a diffuse form and at relatively low temperatures. The conversion of solar thermal energy to electrical energy through existing conventional engines has been handicapped by the fact that the engines have been adapted to operate efficiently mainly at relatively high energy inputs. At low temperatures the conventional engines are relatively inefficient not only because of a low Carnot efficiency but also because of high operational losses, and low force outputs.

Past attempts to adapt solar energy to conventional engines have included utilization of means designed to increase solar energy inputs. For example, solar radiation concentrating means such as parabolic mirrors have been used to superheat water and water vapor for conventional steam engines. This has increased not only the temperature of solar energy but also its price and rendered the energy less competitive with alternate fossil and nuclear energy sources.

The present solar differential pressure engine is based upon the concept that it is cheaper to adapt the engine to the energy than to adapt the energy to the engine. The present report describes an engine which is especially adapted to operate at temperature ranges available in flat plate collector systems. In contrast to conventional engines the solar engine operates at low temperature inputs with relatively little operational losses, and can yield a relatively large force output.

The engine can be used to obtain practically unlimited amount of low cost electric energy through temperature differentials between flat plate collector systems and ambient air. Vast geographic areas of practically every climate are rendered suitable for the practical conversion of solar thermal energy to mechanical and electric energy. In torrid and temperate zones the engine can be used in roofs of small homes, in shore areas of oceans, lakes and rivers, and in dry desert areas. In frigid zones, the engine can be used to extract practically unlimited quantities of energy from natural large bodies of cold water through a temperature differential between the cold water and colder air.

The objectives of the present invention are:
1. To provide an engine which can convert solar thermal energy trapped in flat plate collector systems to mechanical and electrical energy.
2. To provide an engine which can exploit ambient temperature differentials for production of useful work.
3. To provide a small vapor or steam engine responsive to small pressures with relatively little operational losses.

Other objectives may become evident during the detailed description of the engine.

SUMMARY OF THE INVENTION

The invention describes an engine designed to operate efficiently at low pressures and temperatures. It operates through a relatively small temperature differential between 2 interconnected sealed chambers containing a low boiling point fluid. One chamber is exposed to relatively warm temperature and functions as an evaporator. The other chamber is exposed to lower temperatures and functions as a condenser.

A conduit-tube is immersed at its lower open end in the fluid in the evaporator chamber. The conduit divides at its upper opened end into two conduit branches which communicate with the vapor phases of the cold and warm chambers. A valve controls the communication of branch conduits with the vapor phases. When the branch-conduit to the vapor phase of the cold chamber is open, and the branch-conduit to the warm chamber is closed, fluid rises in the conduit. When the valve closes the branch-conduit to the vapor phase of the cold chamber and opens the branch-conduit to the vapor phase of the warm chamber, the fluid which has risen in the conduit returns to its original level. The movement of the fluid is translated to useful work through a float responding to the fluid level in the conduit. The movement of the float is synchronized with the action of the valve to obtain a cyclic movement of the float. Vapor is condensed to liquid in the cold chamber and is returned to the evaporator chamber by gravity or a pump. Means to obtain a temperature differential between the chambers include selective exposure of one chamber to solar radiations in flat plate collector systems, selective immersion of one chamber in a natural cold or warm body of water, and selective evaporation of water from the surfaces of the cold chamber.

In one form of the invention a mercury layer is placed under the low boiling point fluid layer. The mercury rises in the conduit and exerts a relatively large buoyant force per unit volume of the float.

In another form of the engine the warm chamber communicates intermittantly directly with the atmosphere and functions as a highly efficient fuel-powered vapor or steam engine.

In all of the figures similar parts have been given similar numbers.

DETAILED DESCRIPTION

Figure 1:
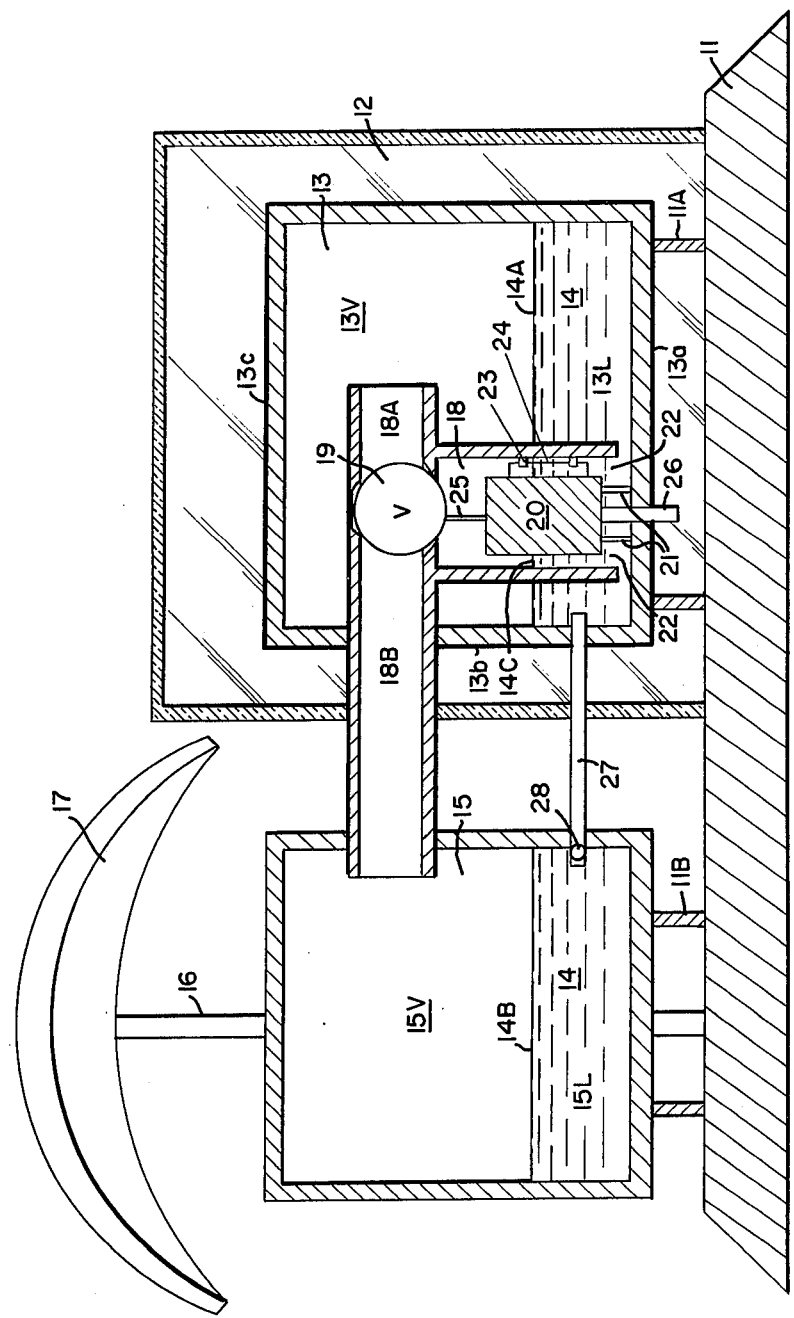
FIG. 1 is a diagrammatical sectional view of a low temperature engine embodying the present invention.

Referring to the drawings there is shown in FIG. 1 a low temperature engine embodying the present invention. As shown a support or base 11 is provided for supporting a transparent enclosure (e.g. a glass or plastic enclosure) 12. The walls of the enclosure 12 are adapted to allow sunlight to enter freely into the enclosure but to hinder heat from leaving the enclosure. The surfaces of all members situated within the enclosure are painted black to augment the absorption of heat from solar radiation entering the enclosure. Present inside enclosure 11 is a chamber 13 which functions as an evaporator as will be hereinafter described. The chamber 13 is supported by extension 11A from base 11. In the illustrated form of the invention the evaporator chamber is defined as a rectangular chamber having bottom wall 13a, sidewall 13b, and upper wall 13c. Chamber 13 contains a liquid, preferably a low boiling point liquid 14, wherein the liquid supply 14 defines a liquid level 14A, a liquid chamber portion 13L, and a vapor portion 13V.

Suitably supported on a frame extension 11B is another chamber 15 which functions as a condensor as will be hereinafter described. Chamber 15 contains a supply of activating fluid 14. The activating fluid defines a liquid level 14B which divides chamber 15 into a vapor chamber portion 15V and a liquid chamber portion 15L.

Suitably supported on column 16 is a solar shield 17 made out of nontransparent material, e.g. wood. In the illustration of the invention the solar shield is in the form of a dome which is adapted to shield condensor chamber 15 from direct rays of the sun.

Inside evaporator chamber 13 there is a conduit-tube 18. The open lower end of the conduit 18 dips into fluid 14 of evaporator chamber and fluid 14 defines a fluid level 14C inside conduit 18. The conduit 18 extends to the upper portion of evaporator chamber 13 where it divides into two branch conduits 18A and 18B. Branch conduit 18A communicates through its open end with vapor portion 13V of evaporator chamber 13. Branch conduit 18B leaves chamber 13 through side wall 13b and communicates through its open end with vapor portion 15V of chamber 15. The branch conduit 18B forms a tight fit with penetrated side walls of chambers 13 and 15 in order to avoid leakage from the sealed chamber. Appropriate sealing material may be used. Valve 19 is present inside conduit 18 at the junction of the main conduit 18 with branch conduits 18A and 18B, and controls the opening and closing of branch conduits 18A and 18B.

Present inside main conduit 18 is a float 20 which is supported by wall extension 21 of bottom wall 13a of chamber. The float 20 defines an interspace 22 between the walls of float 20 and conduit 18 so as to allow the vertical movement of the float 20 in the conduit 18. Suitable guide means are provided for maintaining the position of the float 20 relative to conduit 18 during such relative movements. The guide rings may comprise guide rings 23 connected to the internal sidewalls of conduit 18 to ride along guide member 24 connected to the sidewalls of float 20. A valve actuator 25 is interconnected between upper wall of float 20 and valve 19. The arrangement is such that when the float 20 travels downward and is in its lowest position valve 19 opens branch-conduit 18B and closes valve 18a. When float 19 travels upwards and reaches it upper limit of travel valve 19 closes branch-conduit 18B and opens branch-conduit 18A. Connected to the lower wall of float 20 is a force transmitting rod 26. Rod 26 penetrates lower wall 13a of chamber 13 and is connected through conventional linkages (not shown) with work producing means such as a generator. Rod 26 fits closely with penetrated lower wall 13a to prevent leakage of fluid 14 from the chamber 13.

Connecting the liquid chamber portion 13L of chamber 13 with the liquid chamber portion 15L of chamber 15 is a conduit 27. A one way valve 28 is interposed in conduit 27 to regulate the flow of liquid between 13L and 15L. The valve 28 is constructed to allow the movement of fluid from chamber 15 to chamber 13, but does not allow the movement of fluid in the opposite direction.

The operation of the differential pressure engine as described in FIG. 1 is as follows:

During a sunny or hazy day, solar radiation enters transparent enclosure 12 and increases the temperature of the air inside enclosure 12 and of evaporator chamber 13 to above ambient temperature. In contrast, solar rays are prevented from reaching condensor chamber 15 by solar shield 48. This results in a temperature differential between chambers 13 and 15. During its starting low position float 20 rests upon support 21. Valve 19 closes conduit branch 18A and opens conduit branch 18B. The activating fluid 14 will evaporate within chambers 13 and 15, creating a vapor pressure within the chambers. Since the temperature in chamber 13 is higher than the temperature in chamber 15 the vapor pressure in chamber 13 will be larger than the vapor pressure in chamber 15.

Since branch conduit 18B is open the vapor pressure upon liquid surface 14C inside conduit 18 is equal to the vapor pressure inside condensor chamber 15. In contrast, the vapor pressure upon liquid surface 14A outside of the conduit is equal to the higher vapor pressure inside evaporator chamber 13. This will cause fluid 14 to rise in the conduit 18 and interspace 22 and to lift float 20. On rising, and as float 20 reaches its upper limit of travel valve actuator 25 will cause valve 19 to close branch conduit 18B and open branch conduit 18A. When this occurs both ends of conduit 18 are exposed to equal vapor pressures. The differential pressures upon liquid surfaces 14A and 14C which has caused liquid to rise in conduit 18 will thus be absent. This will cause the liquid level in conduit 18 to drop to its low starting level. The buoyant force which has lifted float 20 is thereby removed and float 20 will move downward through the force of gravity. As float 20 moves downward and approaches its lower limit of travel it causes valve actuator 25 to close conduit branch 18A and open conduit branch 18B to renew the cycle of operation. When conduit 18B opens vapor which has entered conduit 18 during the opening of branch conduit 18A leaves conduit 18 and enters condensor chamber 15. Since the temperature of condensor chamber 15 is relatively low the vapor condenses to form fluid which accumulates in the lower portion of chamber 14. When the fluid in chamber 15 reaches a level which is higher than the fluid level 14A in chamber 13 the fluid leaves chamber 15 by force of gravity and enters chamber 13 through conduit 27. In a complete cycle of operation the up and down movement of the float 20 will effect corresponding movement of the force transmission member 26. This movement is readily translated, through appropriate linkages, to useful work.

It is understood that a temperature differential between the evaporator and condensor chambers may be obtained by other means without departing from the essential features of the invention. This may include selective wetting of the surfaces of condensor chamber 15 to cool chamber 15 by natural evaporation of the water. This evaporation may be augmented by means of increasing air circulation around the surfaces of the condensor such as by means of auxiliary fans. Under conditions in which the temperature of a natural body of water is warmer than the atmosphere, transparent enclosure 12 may be omitted and chamber 13 immersed in the relatively warm body of water.

Figure 2:
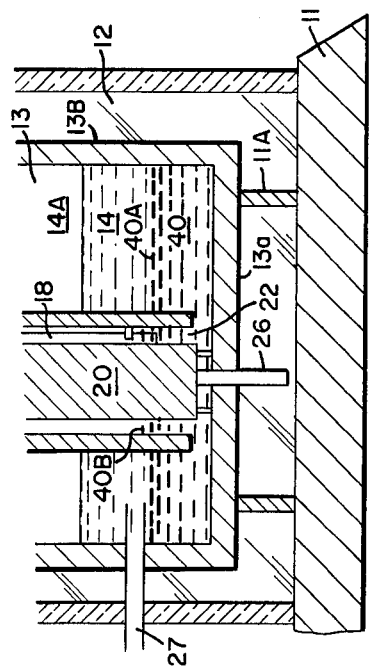
FIG. 2 is a diagrammatical sectional view of a modified lower portion of the evaporator chamber.

FIG. 2 represents a modification in warm chamber 13. It is similar in all respects to chamber 13 as described in FIG. 1 except that it contains, in addition to the low boiling fluid 14, a fluid of high density, e.g. mercury 40. Because of its relatively high density the mercury 40 will settle in the lower portion of chamber 13 underneath the low boiling fluid 14. Conduit 18 dips in the high density fluid 40 instead of fluid 14. The liquid 40 will form a liquid level 40A outside of conduit 18 and a level 40B inside conduit 18.

The operation of the engine associated with chamber 13 as described in FIG. 2 is similar in all respects to the operation of the engine described in FIG. 1 except that the differential pressure between inside and outside of conduit 18 is transmitted to fluid levels 40A and 40B and causes fluid 40 to rise in conduit 18 and interspace 22. Because of relatively high density of mercury 40 the buoyant force upon float 20 will be larger than the buoyant force exerted by the fluid 14.

Figure 3:
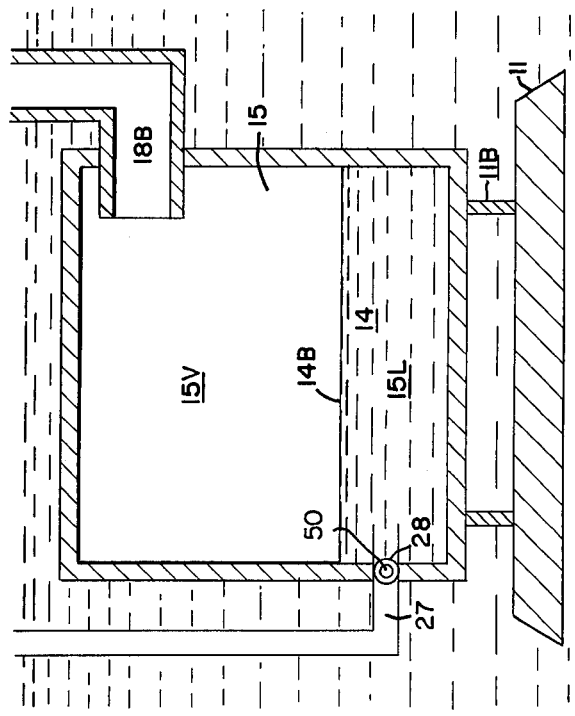
FIG. 3 is a diagrammatical sectional view of a modified form of the condenser chamber.

FIG. 3 illustrates a condensor chamber 15 which is adapted to be cooled by immersion in a relatively cold natural body of water (w). It is similar to the condensor chamber 15 described in FIG. 1, except that column 16 and dome 17 have been omitted and pump 50 added to conduit 27 to pump the liquid condensate from the condensor chamber 15 to evaporate chamber 13. The engine operates through a temperature and pressure differential exactly as described in FIG. 1, except that the condensate from cold chamber 15 in FIG. 3 returns to evaporator chamber 13 and through gravity, but through the action of pump 50.

Figure 4:
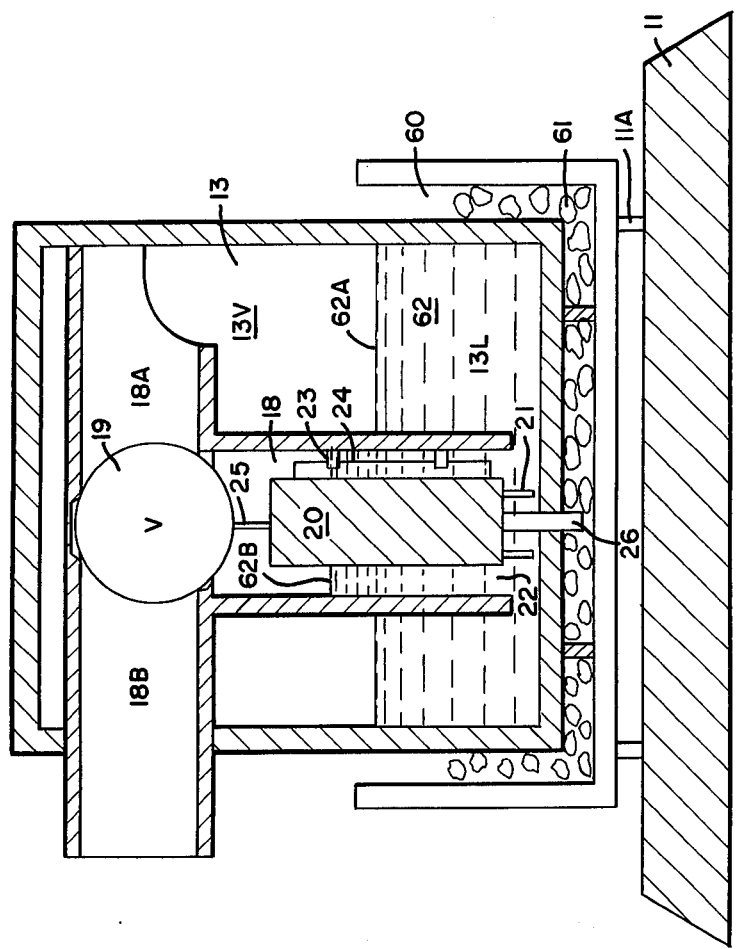
FIG. 4 is a diagrammatical sectional view of a modified form of the evaporator chamber.

FIG. 4 represents a differential pressure engine adapted to operate through conventional fuels. It is essentially similar to FIG. 1 and similar parts have been given similar numbers. Cold chamber 15, conduit 27, valve 28, and transparent chamber 12, have been omitted. Branch conduit 18B opens directly into the atmosphere instead of into cold chamber 15. Container 60 surrounds the lower part of chamber 13 and contains conventional fuel 61 such as coal or wood designed to burn and heat container 13. Fluid 62 inside container 13 consists of water instead of low boiling point fluid 14. It defines a water level 62A outside conduit 18 and a level 62B inside conduit 18.

The operation of the differential pressure engine as described in FIG. 4 is as follows: Fuel 61 in container 60 burns and heats container 13 and water 62. This causes water 62 to evaporate and to increase the vapor pressure in container 13. When valve 19 opens branch conduit 18B and closes branch conduit 18A the vapor pressure upon fluid surface 62A outside conduit 18 is larger than the vapor pressure upon fluid surfaces 62B inside conduit 18. This causes fluid to rise in interspace 22 in conduit 18 and to lift float 20. When float 20 reaches a predetermined upper limit of travel valve activator 25 closes branch conduit 18B and opens branch conduit 18A. This equalizes the pressures upon surfaces 62A and 62B and causes fluid 62 in conduit 18 and float 20 to return to their original low starting level. When float 20 reaches its lowest limit of travel valve 19 closes branch conduit 18A and opens branch conduit 18B to renew the cycle of operation. Vapor which enters conduit 18 during the opening of conduit through branch 18A escapes to the atmosphere during the opening of branch-conduit 18B. The reciprocal up and down movement of float 20 is translated into useful work through conventional linkages to force transmitting member 26. The engine as described in FIG. 4 may thus function as a small steam engine with relatively little operational losses. It is understood that a high density fluid as described in FIG. 2 may be added to increase the force output per unit float volume.

While the invention has been described with reference to the embodiments in FIGS. 1-4, it will be readily understood that modifications of the invention may be made without departing from the essence of the invention as described in the following claims.

What is claimed is:

1. A low temperature engine comprising a warm chamber, adapted to keep a fluid at a relatively warm temperature, a cold chamber adapted to keep a fluid at a relatively cold temperature, said chambers being sealed from the outside air, a supply of evaporating liquid in said chambers having a liquid level partitioning the chambers into vapor chamber portions and liquid chamber portions, a tube which dips at its low open end in liquid portion inside warm chamber to define a liquid surface area inside and outside said tube, means for intermittant communication of liquid surface area inside the tube with vapor phases of the cold and warm chambers, to effect changes of the fluid level, and means for obtaining a temperature differential between the chambers.

2. The invention as described in claim 1 and including a float which responds to fluid levels in the warm chamber.

3. The invention as described in claim 1 and including means for synchronizing the fluid levels in the tube with communication of said tube with vapor phases of cold and warm chambers to obtain cyclic changes in fluid levels.

4. The invention as described in claim 2 and including a high density fluid in the warm chamber to increase the buoyant force acting upon said float.

5. A low temperature vapor engine comprising a chamber, a supply of evaporating liquid in said chamber having a liquid level partitioning the chamber into a vapor chamber portion and a liquid chamber portion, a tube immersed in said liquid portion to define a liquid surface area inside and outside said tube, means for alternating communication of liquid surface inside said tube with vapor phase of warm chamber or the outside atmosphere, to affect changes in fluid level inside said tube, a float responding to said changes in liquid levels, a force receiving means for translating the movement of said float to useful work, and means for heating the liquid inside said chamber.

6. The invention as described in claim 1 wherein said means for obtaining a temperature differential include a transparent chamber enclosing the warm chamber to heat said chamber by solar radiation.

7. The invention as described in claim 6 and including a solar shield to prevent direct solar radiation from reaching the cold chamber.

8. The invention as described in claim 1 and including means for submerging one chamber in a body of water.

9. The invention as described in claim 8 and including pump means for return of liquid condensate from cold to warm chamber.

10. The invention as described in claim 1 and including means for selective wetting of surface of one chamber to cool said chamber by evaporation.

11. The invention as described in claim 1 and including a moving part responding to said changes in fluid level.

* * * * *